(12) United States Patent
Haimi-Cohen et al.

(10) Patent No.: US 8,161,515 B2
(45) Date of Patent: Apr. 17, 2012

(54) FAST CHANNEL CHANGE HANDLING OF LATE MULTICAST JOIN

(75) Inventors: Raziel Haimi-Cohen, Springfield, NJ (US); John P. Hearn, Chatham, NJ (US)

(73) Assignee: Alcatel Lucent, Paris (FR)

( * ) Notice: Subject to any disclaimer, the term of this patent is extended or adjusted under 35 U.S.C. 154(b) by 254 days.

(21) Appl. No.: 12/464,982

(22) Filed: May 13, 2009

(65) Prior Publication Data

US 2010/0293587 A1    Nov. 18, 2010

(51) Int. Cl.
  - H04B 1/66    (2006.01)
  - H04N 7/12    (2006.01)
  - H04N 11/02   (2006.01)
  - H04N 11/04   (2006.01)
  - H04N 7/173   (2011.01)
  - H04N 7/16    (2011.01)

(52) U.S. Cl. ............. 725/90; 725/86; 725/89; 725/94; 725/95; 725/97; 725/143; 725/148; 375/240; 375/240.01; 375/240.04

(58) Field of Classification Search ............. 725/94
See application file for complete search history.

(56) References Cited

U.S. PATENT DOCUMENTS

| | | | | |
|---|---|---|---|---|
| 6,006,289 | A * | 12/1999 | James et al. | 710/35 |
| 2005/0081244 | A1 | 4/2005 | Barrett et al. | |
| 2005/0099944 | A1 * | 5/2005 | Cha | 370/229 |
| 2005/0183120 | A1 * | 8/2005 | Jain et al. | 725/46 |
| 2007/0192812 | A1 * | 8/2007 | Pickens et al. | 725/94 |
| 2008/0192839 | A1 * | 8/2008 | Gahm et al. | 375/240.26 |
| 2008/0282301 | A1 | 11/2008 | Liu et al. | |

FOREIGN PATENT DOCUMENTS

| | | |
|---|---|---|
| EP | 1 523 190 A1 | 4/2005 |
| EP | 1 708 506 A2 | 4/2006 |

OTHER PUBLICATIONS

B. Versteeg et al., Unicast-Based Rapid Acquisition of Multicast RTP Sessions, IETF, Apr. 16, 2009.
G. Hirson et al., Proposal for DVB-IPTV Fast Channel Change, Rev. 1.1, Microsoft Corp., Alcatel-Lucent, Cisco Systems Inc., Nov. 2008.

* cited by examiner

*Primary Examiner* — Justin Shepard
(74) *Attorney, Agent, or Firm* — Brosemer, Kolefas & Associates, LLC

(57) ABSTRACT

In an internet protocol television (IPTV) system, fast channel change (FCC) transactions that experience late multicast joins are handled specially, thereby allowing the system to be provisioned for the vast majority of multicast joins that are within an expected range. During an FCC transaction, the subscriber interface device, such as a set-top box (STB), can determine how long it can wait to join the multicast stream of the new channel before a gap can be predicted to occur in the handover from the FCC unicast to the multicast. If the STB has not joined the multicast stream by the determined time, a recovery procedure is invoked in which the STB sends a RESTART request to the FCC server which, in turn, increases the rate of the FCC unicast as if the FCC transaction were restarted, thus allowing the handover to occur seamlessly. This solution reduces the demands of each FCC transaction, allowing for greater scalability and reduced cost.

24 Claims, 5 Drawing Sheets

FAST CHANNEL CHANGE HANDLING OF LATE MULTICAST JOIN

FIELD OF INVENTION

The present invention relates generally to internet protocol television (IPTV), and more particularly to fast channel change (FCC) methods and apparatus.

BACKGROUND

In a typical signal distribution system providing Internet protocol television (IPTV) over digital subscriber line (DSL) or fiber, a subscriber or user is provided with an interface device, such as a set-top box (STB) or receiver, for communicating with network equipment, which may comprise, for example, a DSL access multiplexer (DSLAM). The interface device is configured to receive and process for presentation on a television or the like, a content stream corresponding to a channel selected by the user.

In order to receive a given selected channel in an IPTV system, the subscriber interface device will typically join a multicast stream corresponding to the selected channel. This is problematic in that there can be a substantial delay, on the order of several seconds, between user entry of a channel change command and receipt of decodable multicast data for the new channel. Because decoding the video stream is typically a recursive process, i.e., decoding a frame relies on previously decoded frames, decoding must start at an "entry point," where no prior frames are needed. Therefore, once an STB joins the multicast of a new channel, it has to wait for the next entry point in the stream in order to begin decoding. The interval between such entry points, however, may be hundreds of milliseconds or even seconds. This is the major cause of delay in channel change. During this channel change delay period, the screen of the presentation device is usually blank or frozen, which can be particularly annoying to the viewer when channel surfing.

One approach used in IPTV to address the problem of channel change delay has been to deploy fast channel change (FCC) servers in the distribution system. An FCC server caches the last few seconds of the content stream for each channel. In response to a subscriber's entry of a channel change command, the subscriber's STB sends an FCC request to the FCC server. The FCC server sends in unicast to the STB a short stream of video from the new channel for immediate playback, starting at some entry point in the past (behind the current multicast packet). The FCC server sends the data to the STB at a data rate faster than the channel's data rate, in which case, after a few seconds, it "catches up" with the multicast stream for that channel. The STB begins playing the new channel shortly after it receives the first unicast packet; hence the channel change appears to be fast. Once the FCC server "catches up" with the multicast, it signals the STB to join the multicast stream for the new channel. The STB joins the multicast and continues to play from the multicast stream. A description of an exemplary implementation of this conventional approach can be found in U.S. Patent Application Publication No. 2005/0081244, entitled "Fast Channel Change."

Generally, the subscriber's loop (between the STB and DSLAM) is of limited bandwidth. If the FCC server were to send the FCC unicast to the STB at the channel's data rate in parallel to the multicast, packet loss might occur. To prevent such an occurrence, shortly after signaling to the STB to join the multicast, the server drops the unicast rate to a fraction of the channel data rate. Therefore, during the time from receiving the "join multicast" signal until beginning to receive the multicast input, the STB receives data at a rate significantly lower than the rate at which it consumes data, with the balance obtained from a buffer which had been accumulated before, when the server unicast rate was higher than the channel data rate. In order to prevent the buffer in the STB from running out before decoding of the multicast stream begins, the server has to select the starting point at a sufficiently long delay.

A significant drawback of the conventional FCC approach, however, is that the amount of data per FCC transaction is very sensitive to the variability of the multicast join time, that is, the time from sending a join request until receiving the first multicast packet. This interval can be modeled as a random variable with a long-tailed distribution that can vary from a few milliseconds to several hundreds of milliseconds. As such, provisioning a conventional FCC system for all cases of multicast join time results in a major increase in FCC transaction duration, which for most cases is not needed, and makes it harder to scale-up the FCC system to handle greater numbers of FCC transactions.

Another approach to the channel change delay problem relies on a high bandwidth link to the subscriber. Generally, using more bandwidth alleviates the problem, but due to limitations in the distribution system, additional bandwidth may not be available or cost-effective.

Thus, there is an unsolved need to adequately reduce the duration and amount of data sent of the unicast streams sent by a FCC server when subscribers change channels for video distributed in an IP network environment.

SUMMARY

The present invention in the illustrative embodiments provides improved techniques for fast channel change in an IPTV system or other type of signal distribution system.

In an illustrative embodiment of a fast channel change (FCC) procedure of the invention, after an FCC server has completed unicast transmission to a user interface device, such as a set-top box (STB), and the STB has requested to join the multicast stream for the new channel, the STB is configured to predict whether it will run out of packets at least some interval (e.g., several hundred milliseconds) before that actually happens. If the STB predicts that it will run out, it leaves the multicast and sends a message, referred to herein as a RESTART message, to the FCC server. In response to the RESTART message, the FCC server increases its output data rate to the unicast level, which is faster than the multicast rate. When the FCC server catches up with the multicast, it signals the STB to join the multicast for the new channel and the transaction continues as before.

Implementation of such an exemplary recovery procedure allows planning the FCC server for the vast majority of common cases rather than for the worst case. In the few cases where the multicast join time exceeds the designed-for join time, the recovery procedure will re-start the FCC transaction to prevent a gap in the handover from the FCC unicast to the multicast. Among other benefits, this solution allows a smaller initial delay between the FCC unicast and multicast streams, less data sent per FCC transaction, faster FCC transactions, and improved scalability, without requiring a higher bandwidth to the subscriber.

The aforementioned and other aspects, features and benefits of embodiments of the present invention will be apparent from the figures and description which follow.

BRIEF DESCRIPTION OF FIGURES

Some embodiments of apparatus and/or methods in accordance with embodiments of the present invention are now described, by way of example only, and with reference to the accompanying figures in which.

DESCRIPTION OF EMBODIMENTS

In this description, it is assumed that the reader is familiar with the basic operating principles and architectures of digital distribution systems such as video-over-IP networks. The invention will be described herein in conjunction with illustrative embodiments of signal distribution systems and associated fast channel change (FCC) processing techniques. It should be understood, however, that the invention is not limited to use with the particular systems and techniques described, but is instead more generally applicable to any signal distribution system in which it is desirable to provide improved handling of FCC requests. For example, although described herein primarily in the context of IPTV systems, the techniques of the invention can also be adapted in a straightforward manner to other types of signal distribution systems, including, for example, cellular systems. Moreover, although described herein primarily in the context of video, the techniques of the invention can be applied to any type of streaming content, including, for example, audio, or audio and video.

Figure 1:
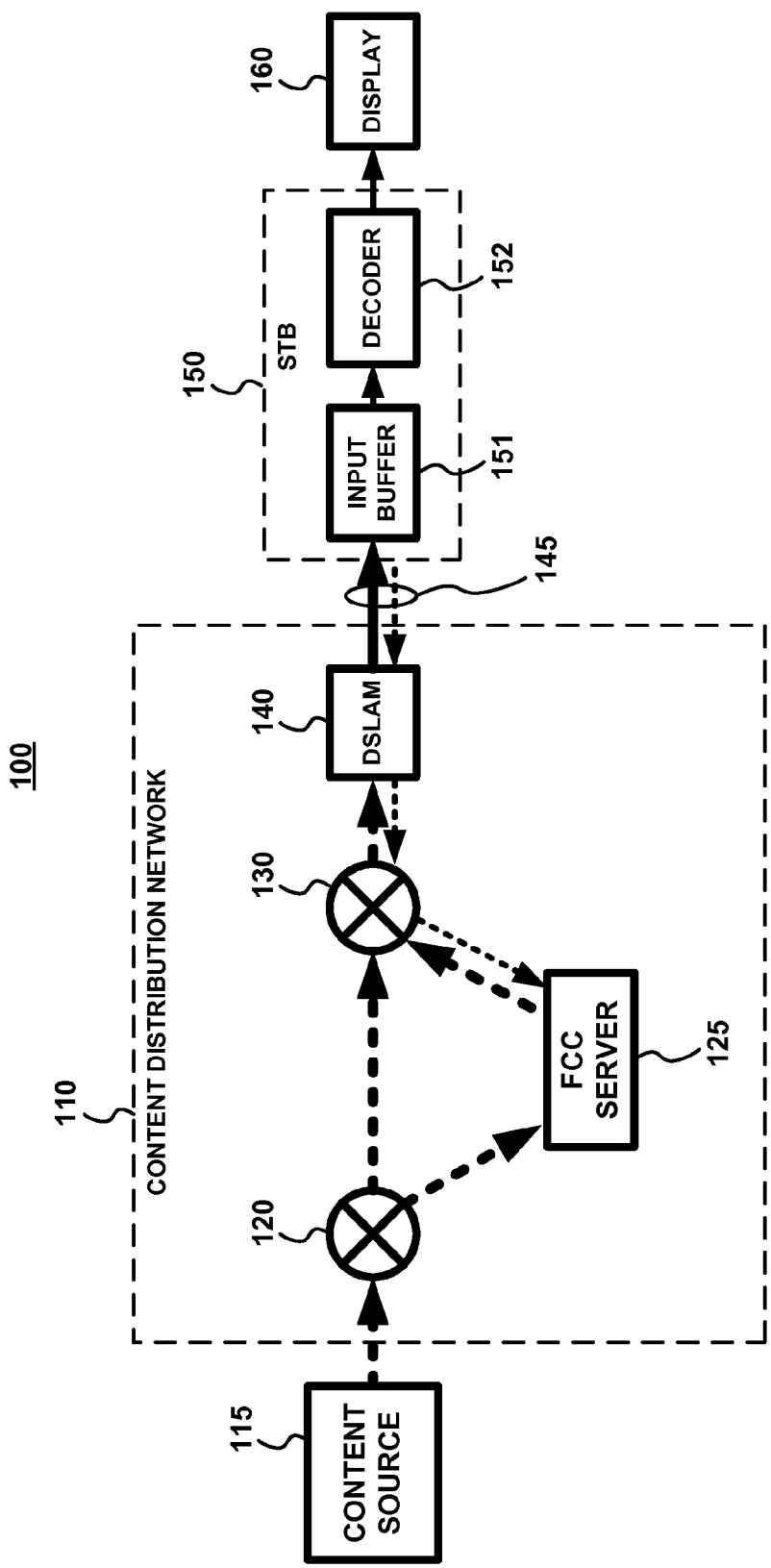
FIG. 1 is a schematic representation of an exemplary environment in which the present invention can be either fully or partially implemented.

FIG. 1 is a schematic representation of an exemplary environment 100 in which the present invention can be either fully or partially implemented. Environment 100 includes a content distribution network 110, which in this embodiment is a broadband-over-internet-protocol (IP) network. For example, content distribution network 110 may be a cable, satellite, Digital Subscriber Line (DSL), fiber-optic-to-home, data, and/or a combination of any of the aforementioned types of content distribution networks. Portions of network 110 may be wired or wireless, and have any suitable topology. Content distribution network 110 may also include or be coupled to other networks such as the Internet or an intranet. The network 110 may comprise any type of communication network suitable for transporting signals associated with the provision of television services, and the invention is not limited in this regard. For example, portions of the network 110 may comprise local networks, wide area networks, the Internet, etc. Numerous alternative arrangements are possible, as will be apparent to those skilled in the art.

In network 110, multicast video streams containing encoded content are typically distributed from one or more content sources 115 which may comprise otherwise conventional service provider equipment, including, for example, headend systems, satellites, servers, etc. The network 110 comprises a combination of network elements such as routers and switches 120, 130 and a plurality of nodes such as Digital Subscriber Line Access Multiplexer (DSLAM) 140 for distributing video streams to a plurality of subscriber interface devices, such as a set-top box (STB) 150. For the sake of simplicity, one path from one content source 115, one DSLAM 140 and one STB 150 are shown in FIG. 1. The thick arrows indicate downlink data flow, whereas thin arrows indicate uplink control messages, such as channel change requests.

For purposes of the illustrative embodiments, the subscriber interface device 150 will be assumed to be a set-top box (STB), but in other embodiments may comprise, for example, receivers, computers, cellular handheld terminals or other processor-based devices, in any combination. Such devices are also referred to herein as user interface devices or "clients" and may be implemented as a separate device, such as an STB, a satellite receiver (not shown), a modem (not shown) or other devices which are connected to a presentation device 160 such as a TV. The user interface device 150 may also be integrated with or part of a display device such as a TV, computer (not shown) or monitor (not shown) which has a screen for rendering and displaying content (audio and/or video content). A given device of this type allows one or more users to access content streams that are delivered to the device via the signal distribution system. The STB 150 may have a conventional hardware implementation, including, for example, a processor coupled to a memory and a decoder 152 for converting received content streams to a form suitable for presentation by the device 160. The memory may include an electronic random access memory (RAM), a read-only memory (ROM) or other type of storage device, as well as portions or combinations of such devices. A portion of the memory may comprise an input buffer 151 for storing content streams received from the distribution network 110 and feeding the decoder 152, preferably at a constant bit rate. The processor and memory are used in storage and execution of one or more software programs for implementing interface device portions of the fast channel change processing techniques disclosed herein. The memory may be viewed as an example of what is also referred to herein as a computer-readable storage medium. The network 110 also includes at least one fast channel change (FCC) server 125 arranged at some intermediate point between the content source 115 and DSLAM 140. As described in greater detail below, the FCC server 125 provides a unicast video stream to the STB 150 via DSLAM 140. The FCC server 125 receives the multicast stream from the content source 115 and caches that for provision, when needed, as a unicast stream. In a typical system, a single FCC server 125 will engage in multiple FCC transactions with multiple STBs, often simultaneously. For clarity of description, FCC transactions between one FCC server and one STB are described herein.

In the schematic representation of FIG. 1, router 120 represents the last common router in the multicast route to the STB 150 and to the FCC server 125. Router 130 represents the first common router in the multicast route and the FCC unicast route to the STB 150. Routers 120 and 130 may be the same network element. Dashed or dotted arrows indicate that there may be intermediate network elements (routers, switches) in between which are not depicted in FIG. 1.

Although shown as a separate, stand-alone device, the FCC server 125 may be implemented on a common processing platform with one or more other servers of the system, or may be distributed across multiple such processing platforms. Also, although FIG. 1 shows only a single DSLAM 140, one pair of routers/switches 120, 130, and a single FCC server 125, a given embodiment can of course include multiple such elements. The system 100 may further include additional elements of a type found in conventional implementations of such a system, such as switches, content servers, ad servers, etc.

While the embodiments herein are discussed and described with reference to DSLAMs, those skilled in the art will readily appreciate that the present invention may be adapted for use in conjunction with any type of edge node including servers, routers, switches, satellite transmitters, and other suitable nodes for distributing content from the edge of a network to an end-user. In this embodiment, the DSLAM 140 is a network element which presents an interface of the content distribution network 110 to the STB 150 and can be implemented conventionally.

The STB 150 is coupled to DSLAM 140 via a point-to-point, bidirectional connection 145 which may be a DSL, cable, fiber-optic or wireless link or any other suitable connection. Content streams from the network 110 are passed by the DSLAM 140 on to the STB 150. The STB 150 transmits control messages to the DSLAM 140 such as channel change request messages. Requests for channel changes from the STB 150 go to the DSLAM 140, which passes them on to the FCC server 125.

When the FCC server 125 receives a channel change request, it begins streaming the requested channel data to the STB 150 in unicast for a period of several seconds. Initially, this is the only data stream received by the STB 150 and thus the FCC server 125 can utilize the full bandwidth available to the STB. At some point, the FCC server 125 instructs the STB 150 to join the multicast stream for the new channel and sometimes afterwards the FCC server 125 terminates the unicast stream. Once the STB 150 begins receiving the multicast stream, or at some time before then, the bit rate of the unicast stream has to be dropped accordingly in order to avoid overloading the connection 145 and causing packet loss. This suggests two phases of unicast FCC streaming: a first phase using the full available bandwidth, and a later phase in which the unicast stream is sharing the bandwidth with the multicast stream. For further optimization we introduce an intermediate phase representing the minimum duration of the interval that elapses from the time the instruction to join the multicast stream is sent from the FCC server 125, until the multicast stream begins to arrive at the STB 150, during which the unicast data rate equals the channel data rate.

Figure 2:
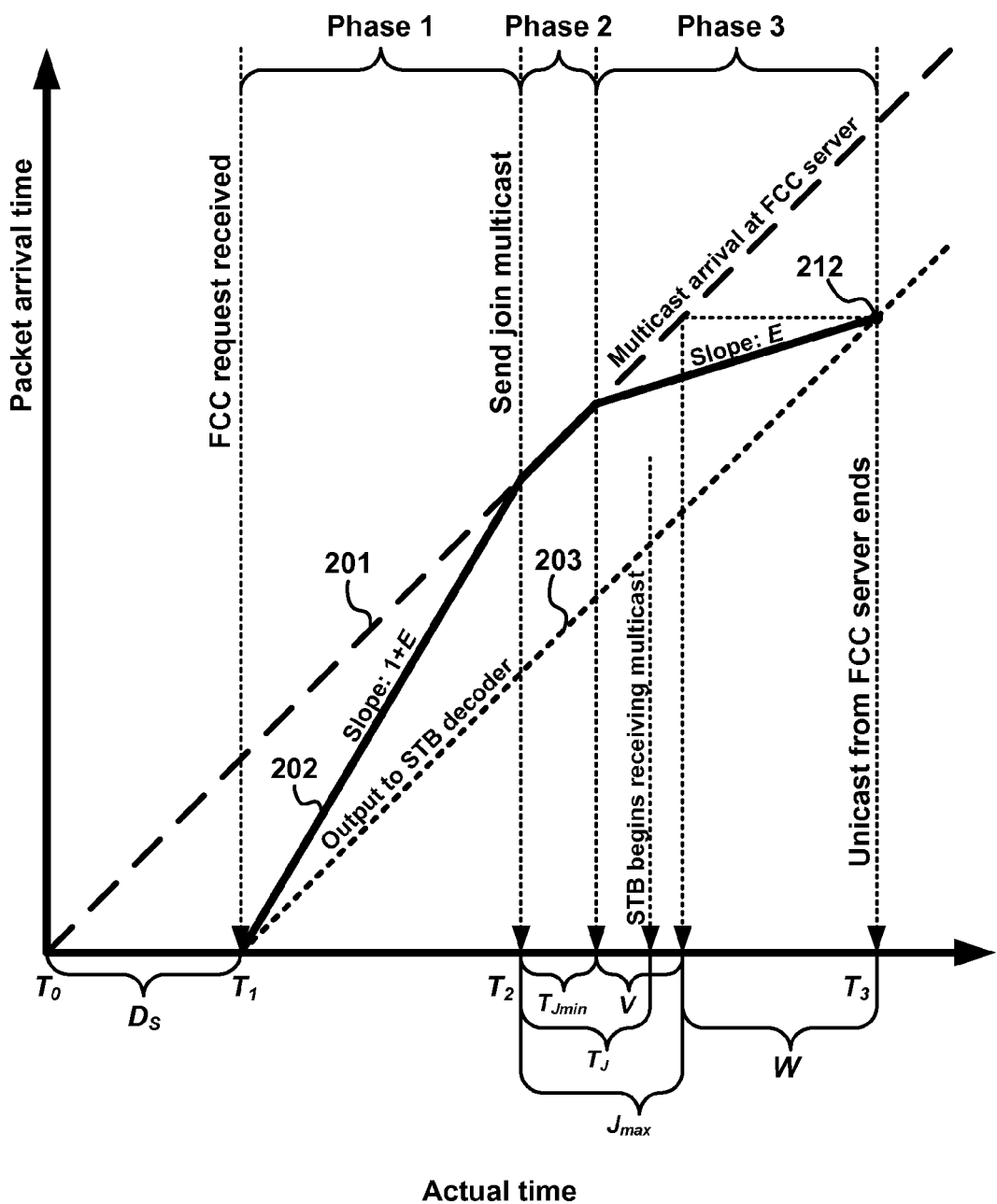
FIG. 2 is a graphical plot illustrating the progression of an FCC transaction in the environment of FIG. 1.

FIG. 2 illustrates the aforementioned phases of streaming in an FCC transaction between STB 150 and FCC server 125. Dashed line 201 represents the arrival of multicast packets of a given content stream at the FCC server 125. These multicast packets arrive at the FCC server continuously. At any given point in time the FCC server has the last few seconds of multicast transmission cached, that is, stored in memory. Solid-lined plot 202 represents the unicast packet transmission from the FCC server 125 to the STB 150. Dotted line 203 represents the output of packets from the buffer 151 to the decoder 152 of the STB 150. In FIG. 2, data rates are normalized so that the multicast data rate is 1 (as represented by line 201), as is the data rate from the input buffer 151 to the decoder 152 of the STB 150 (line 203). Additionally, for clarity of illustration, the following simplifying assumptions are made: all data streams are of constant bit rate, without any jitter; the fact that the data streams may consist of discrete packets is ignored, with each data stream treated as a continuous bit stream flow (terms such as "packet" are used to indicate a specific point in a data stream); denting (skipping frames in the unicast stream by the server) is not performed; once the STB 150 joins the multicast, each multicast packet arrives at the STB and at the FCC server 125 at the same time; the transmission delay of the unicast from the FCC server to the STB is negligible and ignored; processing times at the FCC server and at the STB are negligible and ignored; and the STB begins decoding the new channel immediately when it receives the first unicast packet from the FCC server.

As shown in FIG. 2, Phase 1 begins at time $T_1$ with the reception of the FCC request at the FCC server 125. Since processing delays at the FCC server 125 are assumed to be negligible, as soon as the FCC server 125 receives an FCC request, it begins unicast streaming the requested channel data to the STB 150. The packets sent by unicast are taken from the FCC server's cache beginning with the packet received by the server at time $T_0$. (It should be noted that the packet received by the server at time $T_0$ must be an entry point.) The difference $D_S$ between $T_1$ and $T_0$ is the initial time gap between the incoming multicast packets and the outgoing unicast packets. The determination of this interval is discussed below in greater detail. The rate of the unicast streaming during Phase 1 is 1+E, where E is a burst factor (E>0). Sending data from the FCC server 125 at a rate higher than 1 is possible because the sending begins at a point which is a period $D_S$ behind the multicast reception at the FCC server. Preferably, E is selected so that 1+E is the available bandwidth for streaming data to the STB 150. Because the FCC server output data rate 1+E is higher than the input rate 1, the gap between the incoming multicast packets and the outgoing unicast packets is decreasing during Phase 1. Typically, the duration of phase 1 may be several seconds.

When the time gap between the multicast stream arriving at the FCC server 125 and the unicast stream leaving the server becomes zero, i.e. when incoming packets are sent from the FCC server to the STB 150 essentially as soon as they are received by the FCC server, the FCC server 125 instructs the STB to join the multicast. The STB 150, in turn, sends an internet group management protocol (IGMP) join request to DSLAM 140 at time $T_2$. This marks the beginning of Phase 2. There is an interval $T_J$ from the sending of an IGMP join request by the STB 150 at time $T_2$ until the time at which the first multicast packet is received by the STB 150. The interval $T_J$, referred to as the multicast join time, is a random variable which changes from request to request. It has a minimum, $T_{Jmin}$, but its distribution has a long tail and $T_J$ can have a high maximum value. The significance of the multicast join time and its variability in an FCC transaction are discussed below in greater detail.

Phase 2 is the interval starting at time $T_2$ and lasting up to $T_{Jmin}$. During Phase 2, the FCC server 125 does not have to share the bandwidth with the multicast, but it cannot send data at a rate faster than 1 because after catching up with the multicast, the server cannot send packets faster than the rate at which it receives them. Thus the FCC server 125 continues sending data to the STB 150 at rate 1 for a period no longer than $T_{Jmin}$, which typically will not be more than several tens of milliseconds. In FIG. 2, the relative size of $T_{Jmin}$ is exaggerated for clarity of illustration.

As shown in FIG. 2, upon expiration of the period $T_{Jmin}$, the FCC server 125 reduces the rate of the unicast stream to the STB 150, even though the STB might not actually begin to receive the multicast stream until some later time, $T_2+T_J$. This reduction in the unicast rate at time $T_2+T_{Jmin}$ marks the beginning of Phase 3. Starting at time $T_2+T_J$, the STB 150 receives both the unicast stream from the FCC server 125 as well as the multicast stream. So that the total bit rate of the multicast stream and the unicast stream does not exceed the available bandwidth of 1+E, the FCC server 125 preferably drops the unicast rate to E during Phase 3. Note that the FCC server 125 does not know exactly when the STB 150 begins receiving the multicast stream until after the fact (if at all). Hence it preferably drops the rate at the earliest time at which the STB can begin receiving multicast, namely at $T_2 + T_{Jmin}$.

At each point in time in the graph of FIG. 2, the horizontal difference between the plot 202 and the line 203 is the time interval between the reception of a unicast packet at the STB 150 and the packet's provision to the STB decoder 152. At time $T_3$, plot 202 and line 203 meet and this time interval is substantially zero. As can be seen from FIG. 2:

$$T_3 = T_2 + T_{Jmin} + \frac{D_S}{1-E}. \quad (1)$$

Had the unicast stream continued beyond this point in time, unicast packets would have arrived at the STB 150 after the time at which they would be needed by the decoder 152, i.e. too late to be useful. The last usable unicast packet is represented by point 212 which corresponds to the intersection of plot 202 and line 203. The FCC server 125 can calculate $T_3$ using Eq. 1 and stop the unicast stream no later than time $T_3$, which marks the end of Phase 3. Usually, the duration of Phase 3 is a few hundred milliseconds. It should be noted that in a well-designed system the FCC server 125 does not typically continue to unicast until time $T_3$. Usually the STB 150 receives the first multicast packet and reports to the FCC server 125 the time which corresponds to that first multicast packet. The server keeps streaming until it sends the same packet in unicast and then stops.

In order to avoid any gaps in the stream of data decoded by the STB 150, a seamless handover from the unicast to the multicast streams needs to occur. As will be seen, an important determinant as to whether a seamless handover will occur is the multicast join time, $T_J$. The conditions for a seamless handover will now be discussed.

Let $D_1$ and $B_1$ be the duration and the amount of data sent in Phase 1, respectively. Since the data rate is normalized so that the multicast data rate is 1, $B_1$ is given in time units and represents the amount of data transmitted by the multicast in that length of time. Phase 1 begins with an initial time gap (between multicast arrival at and packet unicast from the FCC server 125) of $D_S$ and ends when this time gap decreases to zero. Because during Phase 1 the FCC server 125 sends data at rate 1+E and receives data at rate 1, $D_1$ and $B_1$ can be determined as follows:

$$D_1 = \frac{D_S}{E}, \quad (2)$$

$$B_1 = D_1(1+E) = \frac{D_S(1+E)}{E}. \quad (3)$$

At time $T_1$, the STB 150 begins to decode the unicast data corresponding to the multicast data at time $T_0$, and since the STB decodes the data at rate 1, it constantly decodes data which is $D_S$ behind the multicast stream at any given point in time. (Note that in FIG. 2, line 203 is parallel to line 201, offset in time by the interval $D_S$.) Therefore, by time $T_2$ when the unicast stream has caught up with the multicast stream and Phase 1 ends, the STB buffer 151 has accumulated an amount $D_S$ of data. The buffer 151 maintains this level during Phase 2, during which the input rate into the buffer equals the output rate to the decoder 152. During Phase 3, however, unicast data arrives at rate E but is decoded by the STB at rate 1. Therefore, assuming 0<E<1, the STB buffer 151 will be depleted at a time $$\frac{D_S}{1-E}$$

after the beginning of Phase 3. The unicast packet decoded when the buffer 151 is depleted corresponds to the multicast packet of $D_S$ before; that is, the multicast packet received by the FCC server 125 at a time $$V = \frac{D_S}{1-E} - D_S = D_S\left(\frac{E}{1-E}\right)$$

after the beginning of Phase 3. Therefore, in order to have a seamless transition at the STB 150 from the unicast stream to the multicast stream, the multicast join should be completed (i.e., the first multicast packet should be received by the STB) no later than V after the beginning of Phase 3. In other words, to avoid a gap in the FCC transaction at the decoder of the STB, the multicast join time $T_J$ should satisfy the following condition:

$$T_J \leq T_{Jmin} + V = T_{Jmin} + D_S\left(\frac{E}{1-E}\right). \quad (4)$$

In this inequality, $T_J$ and E are network parameters that may not be readily alterable or may be beyond the control of the FCC system designer, in which case the only way to insure that no gap occurs would typically be by increasing $D_S$ so that the condition of Eq. 4 is satisfied even for the largest possible value of $T_J$. As seen from Eqs. 2 and 3, this would result in a proportionate increase in the duration of Phase 1 and the amount of data sent during this phase.

As mentioned above, the multicast join time $T_J$ is a random variable with a long-tailed distribution and can occasionally have a large maximum value. As such, it may be impossible or impractical to require a seamless handover from unicast to multicast for the largest possible value of $T_J$; i.e., for the condition of Eq. 4 to always be met. Doing so could make the duration of the unicast stream and the amount of data sent in unicast too large for large scale operation (i.e. running many FCC sessions in parallel).

In an exemplary system, a maximum value of $T_J$ for which the handover can be expected to be seamless with a given, preferably high, probability is specified, designated herein as $H_J$. In other words, $D_S$ is selected so that if the join time $T_J$ does not exceed $H_J$, the handover from unicast to multicast will be seamless with the given probability. $H_J$ is preferably selected so that the probability of $T_J > H_J$ is small (e.g., less than 5%). If, however, the join time $T_J$ does exceed $H_J$, exemplary procedures implemented as described below, can handle such a case to provide a seamless handover. In an exemplary embodiment, $H_J$ has a value of a few hundred milliseconds.

Figure 3:
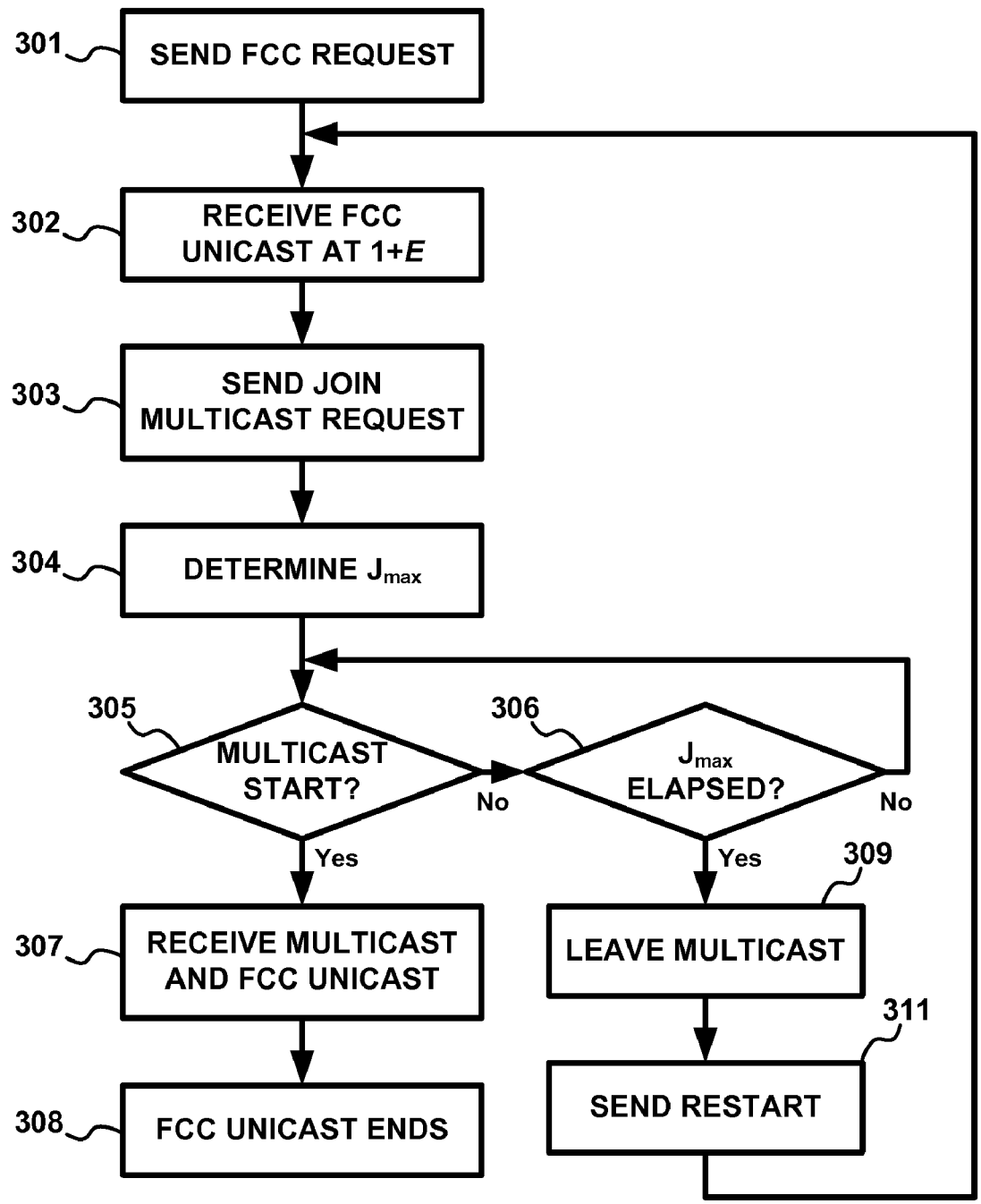
FIG. 3 is a flowchart of an exemplary recovery procedure for handling FCC transactions in which the multicast join does not occur in time to ensure a seamless handover from the FCC unicast to the multicast.

FIG. 3 is a flowchart of an exemplary embodiment of a procedure, as may be carried out by STB 150, for handling an FCC transaction. At 301, in response to a channel change command at the STB 150, an FCC request is sent via the DSLAM 140 to the FCC server 125. The FCC server 125 responsively unicasts data to the STB 150 with some initial time gap $D_S$ and at 302, the STB receives this unicast stream at rate 1+E. As described above with reference to FIG. 2, this occurs in Phase 1. At 303, the FCC transaction proceeds into Phase 2, starting with the STB sending a multicast join request at time $T_2$ responsive to a message from the FCC server.

Once the STB 150 has sent the multicast join request, there will be a time $T_2+J_{max}$ by which if the STB has not received the first multicast packet, it can predict that it will run out of data when the FCC unicast ends at time $T_3$. In other words, if the multicast join time $T_J$ exceeds $J_{max}$ there will be a gap in the stream provided to the STB decoder 152. As shown in FIG. 2, $J_{max}=T_{Jmin}+V$ and the "prior warning" time W is the length of the interval which begins at $T_2+J_{max}$ when it becomes clear that there is a problem, and ends at time $T_3$, when running out of data occurs. The warning time W is substantially independent of the data rates and is typically several hundred milliseconds long. Note that under the simplifying assumptions made above, $W \approx D_S$. As shown in FIG. 2, the time $T_2+J_{max}$ corresponds to the multicast arrival at the FCC server 125 of the last usable unicast packet (represented by point 212) discussed above.

At 304, the STB 150 determines $J_{max}$ based on the level of its buffer 151 at time $T_2$, designated $B(T_2)$, and the burst rate E in accordance with the following expression:

$$J_{max} = T_{Jmin} + B(T_2)\left(\frac{E}{1-E}\right). \quad (5)$$

As discussed above, the level of the STB buffer 151 is substantially constant through Phase 2 and begins to be depleted in Phase 3 so that it will be empty at a time $$\frac{B(T_2)}{1-E}$$

after the start of Phase 3.

The parameters of Eq. 5 used by the STB 150 to calculate $J_{max}$ can be obtained by a variety of suitable means. Because the STB buffer level at time $T_2$ can be expected to be substantially constant through Phase 2, the buffer level may be determined, for example, as soon as the STB 150 receives the message from the FCC server 125 to join the multicast, later within Phase 2 or shortly after the beginning of Phase 3, ostensibly to obtain a more accurate level in case there is a change in the buffer level during Phase 2. (Note that by waiting until Phase 3, an updated estimate of the burst rate E can also be obtained and used in determining $J_{max}$.) The parameter $T_{Jmin}$ can be provisioned in the STB 150, or the STB can estimate it by tracking the interval from the time it receives the signal to join the multicast until the unicast data rate drops to well below 1. The burst rate E may be known to the STB via provisioning or estimated from either the incoming data rate or the rate of depletion of the buffer 151 after the time $T_2+T_{Jmin}$, in Phase 3. Alternatively, any or all of the parameters $D_S$, $T_{Jmin}$, E may be communicated by the FCC server. For example, these values may be included in the message from the FCC server signaling the STB to join the multicast.

At 305, as the STB 150 continues to receive the unicast stream from the FCC server 125, it waits to join the multicast; i.e., it awaits reception of the first multicast stream packet. At 306, while waiting to join the multicast, the STB 150 monitors the time that has elapsed since the join request was sent. If this time has not exceeded $J_{max}$, determined at 304, the STB continues to await the multicast stream as it continues to receive the FCC unicast stream. If the multicast stream begins before the elapsed time exceeds $J_{max}$, operation proceeds normally in Phase 3, as represented by 307. Phase 3 then ends at 308 as the unicast stream from the FCC server 125 ends.

Figure 4:
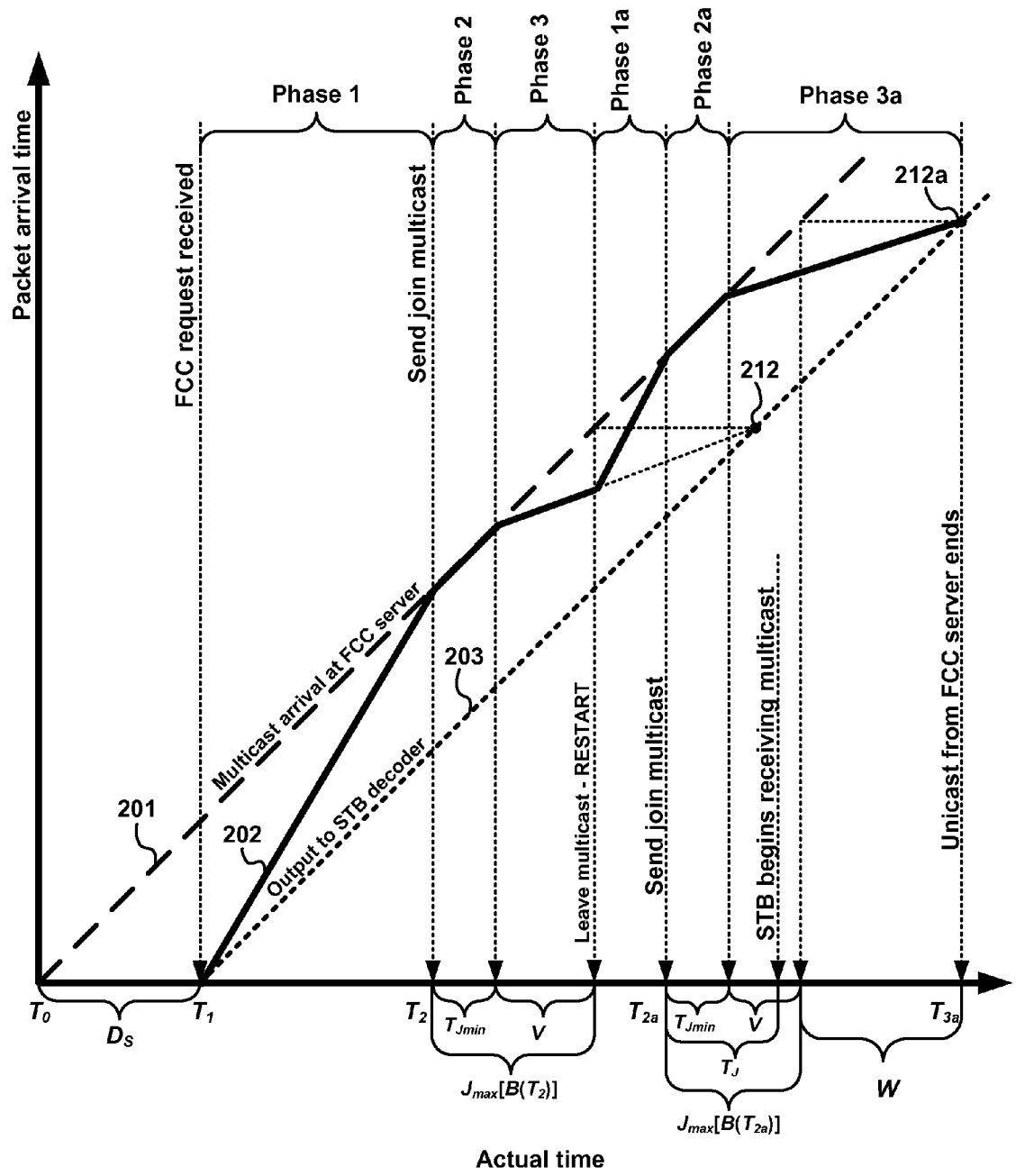
FIG. 4 is a graphical plot illustrating the progression of an FCC transaction in which the exemplary recovery procedure of FIG. 3 has been invoked.

If, however, it is determined at 306 that the elapsed time since the join request was sent has exceeded $J_{max}$ and reception of the multicast stream has not yet started, operation proceeds to 309. At this point, the STB 150 knows that it will run out of data by the time the FCC unicast ends and in response takes preemptive action to prevent such an occurrence. Such a scenario is depicted in FIG. 4. At 309, the STB leaves the multicast group by sending an IGMP "leave" message to the DSLAM 140 and preferably waiting for a short time (e.g. ~100 msec) to verify that the multicast stream has been stopped; that is, that no multicast packets arrive after sending the IGMP "leave" message. Subsequently, at 311 the STB sends a RESTART message to the FCC server 125. With reference to FIG. 4, this occurs at or about time $T_2+J_{max}[B(T_2)]$. (For clarity of illustration, FIG. 4 does not show the aforementioned waiting time between leaving the multicast and sending the RESTART message). The RESTART message acts as an additional request to join the same channel. Upon receiving the RESTART message from the STB 150, the FCC server 125 will revert to a new "Phase 1," designated Phase 1a in FIG. 4, but without backing off, it will simply increase the effective data rate to 1+E and keep unicast streaming data to the STB (FIG. 3, step 302) from the point in which it is currently in the unicast stream.

The RESTART message and its implementation can be incorporated, for example, as an enhancement of a current or new FCC protocol or standard, or as part of a proprietary scheme.

Once the gap between the multicast and unicast is closed (again), the FCC server will instruct the STB to join the multicast, and continue following the same procedure as in the first attempt, with the hope that this time the first multicast packet will arrive sooner. As shown in FIG. 4, the STB sends a multicast join request at time $T_{2a}$ (FIG. 3, step 303). This marks the beginning of a new "Phase 2," designated Phase 2a in FIG. 4. As in Phase 2, during Phase 2a the unicast rate drops to 1 until the interval $T_{Jmin}$ has elapsed at time $T_{2a}+T_{Jmin}$.

As before, sometime during Phase 2a or at the beginning of Phase 3a, the STB 150 will determine (FIG. 3, 304) a new value for $J_{max}$ based on the level of its buffer 151 at time $T_{2a}$ in accordance with Eq. 5. This new value is shown in FIG. 4 as $J_{max}[B(T_{2a})]$. Note that the time $T_{2a}+J_{max}[B(T_{2a})]$ corresponds to the multicast arrival at the FCC server of the last usable unicast packet, as represented by point 212a. The STB 150 then waits, once again, for the multicast to start (305, 306). In the meantime, Phase 2a comes to an end at time $T_{2a}+T_{Jmin}$ and a new "Phase 3," designated Phase 3a begins. As in Phase 3, the unicast rate in Phase 3a drops to E.

In the scenario depicted in FIG. 4, the STB 150 begins to receive the multicast stream before expiration of the time interval $J_{max}[B(T_{2a})]$, at time $T_{2a}+T_J$. As described above, the STB receives both the multicast and unicast streams (FIG. 3, 307) in Phase 3a until the unicast ends at time $T_{3a}$ (308).

Because very long multicast join times are not very common, the probability that the multicast join time will exceed the expected join time more than two, or at most three times consecutively is virtually negligible.

Implementing the exemplary recovery procedure allows the parameter $H_J$ to be set lower; i.e., it makes it possible to design the FCC system for a smaller variation in the multicast join time $T_J$. As discussed above, in order to have a seamless handover, the condition of Eq. 4 must be satisfied. Re-arranging the terms of Eq. 4:

$$D_S \geq \left(\frac{1-E}{E}\right)(T_J - T_{Jmin}). \qquad (6)$$

As indicated by Eq. 6, the minimum value of $D_S$ required for a seamless handover for a join time of $T_J$ is directly related to the difference $T_J-T_{Jmin}$. In a conventional system, without a restart procedure such as that described above, $D_S$ must be set to cover a broader range of the distribution of $T_J$ (e.g., 99.5%) in order to provide acceptable FCC performance. Implementing a restart procedure such as that described above allows $D_S$ to be set to a lower value because a smaller range of the distribution of $T_J$ (e.g., 95%) can be accommodated. FCC transactions in which the join times exceed this range (e.g., the remaining 5% of transactions) can be handled using the recovery procedure. Reducing the requirement $H_J$ thus makes it possible to substantially reduce the duration of each FCC transaction and the amount of data required in an FCC unicast. This makes each FCC transaction less demanding, thereby increasing the availability and the number of FCC requests that can be supported by a given FCC server, thereby also reducing the costs associated with implementing a system having FCC functionality.

Figure 5:
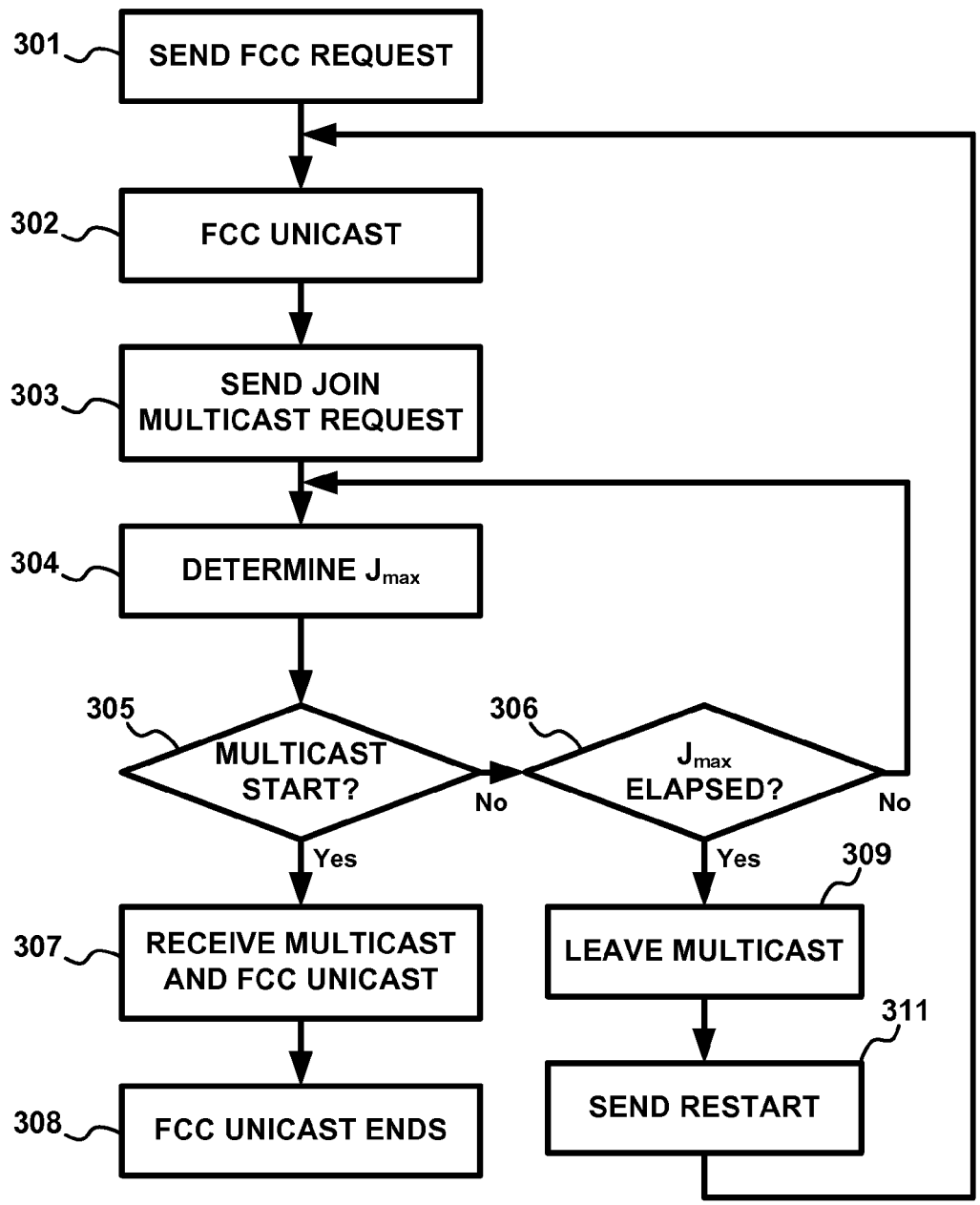
FIG. 5 is a flowchart of a further exemplary recovery procedure for handling FCC transactions in which the multicast join does not occur in time to ensure a seamless handover from the FCC unicast to the multicast.

FIG. 5 is a flowchart of a further exemplary embodiment of an FCC transaction in which the STB repeatedly updates the estimate of $J_{max}$ as it waits to join the multicast (304, 305 and 306). This allows for more accurate estimation of the critical time point $T_{2a}+J_{max}[B(T_{2a})]$ by observing the rate of depletion of the STB buffer over time and is especially useful in situations where some of the aforementioned simplifying assumptions, such as no denting, do not hold. In those situations, the plot 202 may not be exactly piecewise linear and the closer one gets to the critical time point, the better it can be estimated.

A desired goal of an embodiment of the invention is to reduce the average of the duration of Phase 1, $D_1$, and the average of the amount of unicast data transmitted, $B_1$, in Phase 1 of a FCC transaction. Optimizing the selection of the parameter $H_J$ (the maximum allowable multicast join time for normal operation) in accordance with the actual distribution of the multicast join time helps achieve this goal. Selecting $H_J$ too high will result in unnecessarily increasing $D_S$ and therefore also $D_1$ and $B_1$ (per Eqs. 2 and 3), while selecting $H_J$ too low will result in too many FCC transactions going through a recovery procedure, such as the restart procedure described above, and incurring the overhead associated with it. Because of the way that IGMP works, however, popular channels are likely to have a shorter multicast join time than less commonly watched channels. Furthermore, during periods of peak usage, the multicast join time is likely to be longer because IGMP join requests may be delayed longer in queues before being processed. Therefore, in accordance with an exemplary embodiment of the invention, $H_J$ is preferably adaptive to channel, time and/or usage. In other words, the values of $H_J$ and thus $D_S$ are selected in accordance with the channel, time and/or usage.

In an exemplary embodiment, the probability of a FCC transaction resorting to a restart procedure, as described above, is estimated at the FCC server at any given time t as $P_t$. The probability $P_t$ can be estimated, for example, by considering time intervals of fixed duration (e.g. 10 seconds) and in each interval calculating the ratio between the number of FCC transactions using the restart procedure to the total number of FCC transactions in that interval. If the probability $P_t$ exceeds some pre-set target probability $P_d$ (e.g., 5%) then $H_J$ (and $D_S$) is increased and if $P_t<P_d$ then $H_J$ (and $D_S$) is decreased.

The above-described procedure should work well when the target probability $P_d$ which minimizes the average duration of or the average amount of data transmitted during a FCC transaction is known and when $P_d$ does not change over time. If this is not true, however, one can instead use a procedure such as described below in order to minimize the average duration of or the average amount of data transmitted during a FCC transaction.

Firstly, the server may estimate the distribution of the multicast join time directly. As mentioned above, a client typically reports to the FCC server when it receives the first multicast packet in each FCC transaction, which allows the server to determine the multicast join time for each FCC transaction. The FCC server can use these values to estimate the current distribution of the multicast join time for a particular channel, for example by generating a histogram of all multicast join times for a particular channel in a given interval of time (e.g., the last 60 seconds).

Using the estimated multicast join time distribution, the server can set $T_{Jmin}$ to a value according to this distribution. For any value of $D_S$, the corresponding values of $$V = D_S\left(\frac{E}{1-E}\right) \text{ and } J_{max} = T_{Jmin} + V$$

can be determined. Using this $J_{max}$ and the distribution of the multicast join time, one can determine $P_d$, the probability of restart, for this particular value of $D_S$.

As shown in FIG. 4, during Phase 3, the unicast rate into the STB buffer 151 is E while the output rate to the decoder 152 is 1. If the client sends a RESTART message, it does so a time V after the start of Phase 3. When Phase 3 starts, the gap between the incoming unicast and multicast is zero; after Phase 3 starts, the unicast is received at rate E while the multicast proceeds at rate 1. Hence during time interval of V, the gap between the incoming unicast and the multicast is $V(1-E)=D_SE$. This is the delay of the unicast relative to the multicast at the beginning of Phase 1a and it corresponds to the initial delay $D_S$ at the beginning of Phase 1. Using the same reasoning used to derive Eqs. 2 and 3, but substituting $D_SE$ for $D_S$, the duration and the amount of data transmitted during Phase 1a, respectively, are given by:

$$D_{1a} = \frac{D_SE}{E} = D_S, \text{ and} \qquad (7)$$

$$B_{1a} = \frac{D_SE(1-E)}{E} = D_S(1+E). \qquad (8)$$

If more RESTART requests are necessary, the duration and the amount of data transmitted during the first phase after each RESTART request are also $D_{1a}$ and $B_{1a}$, respectively. For estimating the total duration and amount of data transmitted in unicast, initial Phases 2 and 3 and Phases 2a and 3a after each RESTART can be ignored because their durations are typically much shorter than those of Phases 1 and 1a. (The durations of these phases are exaggerated in FIGS. 2 and 4 for illustrative purposes). Moreover, because of the lower data rates in Phases 2, 2a and 3, 3a, the amount of data transmitted in these phases is even lower in comparison to Phases 1, 1a. Based on these simplifying assumptions, the expected total duration $D_{exp}$ and the expected total amount of data sent $B_{exp}$ are given by:

$$D_{exp} = D_1 + D_{1a} \sum_{i=1}^{\infty} P_d^i = D_1 + D_{1a} \frac{P_d}{1-P_d} = D_S\left(\frac{1}{E} + \frac{P_d}{1-P_d}\right), \text{ and} \quad (9)$$

$$B_{exp} = B_1 + B_{1a} \sum_{i=1}^{\infty} P_d^i = B_1 + B_{1a} \frac{P_d}{1-P_d} = D_S(1+E)\left(\frac{1}{E} + \frac{P_d}{1-P_d}\right). \quad (10)$$

Thus for any value of $D_S$, the FCC server can determine $D_{exp}$ and $B_{exp}$ in accordance with Eqs. 9 and 10, respectively. When the FCC server receives a FCC request for a particular channel, it considers the entry points in the cache. Typically the number of such entry points is quite small, often less than ten. Each such entry point corresponds to a value of $D_S$. The FCC server can calculate $D_{exp}$ and/or $B_{exp}$ for each entry point and select the entry point which yields the lowest value(s).

If in a particular embodiment a higher accuracy is needed or desired, it is possible to compute more accurate estimates for $D_{exp}$ and $B_{exp}$ which account for the contribution of all phases. In that case, $D_1$ and $B_1$ in Eqs. 9 and 10 would be replaced by the corresponding expressions for the total durations and unicast data amounts of Phases 1, 2 and 3 and $D_{1a}$ and $B_{1a}$ would be replaced by the corresponding expressions for the total durations and unicast data amounts of Phases 1a, 2a and 3a.

It should be understood that the particular examples and the corresponding assumptions described above are not limitations of the present invention. For example, in other embodiments, the assumptions made above need not apply. Also, the particular phases, parameters and other characteristics of the FCC processing as described above may be varied in alternative embodiments. The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. A method of processing a fast channel change (FCC) transaction comprising the steps of:
    sending a FCC request to a FCC server in response to a channel change request at a user interface device;
    transmitting a unicast stream from the FCC server to the user interface device in response to the FCC request;
    reducing the rate at which the unicast stream is transmitted to the user interface device;
    sending a multicast join request from the user interface device to join a multicast of the requested channel;
    determining a maximum multicast join time for ensuring a seamless handover to the multicast;
    sending a restart message to the FCC server if the maximum multicast join time elapses before the user interface device joins the multicast; and
    restarting transmitting the unicast stream from the FCC server to the user interface device in response to the restart message.

2. The method of claim 1, wherein the maximum multicast join time is determined as a function of a buffer level of the user interface device.

3. The method of claim 1, wherein the maximum multicast join time is determined repeatedly before the user interface device joins the multicast.

4. The method of claim 1, wherein restarting transmitting the unicast stream includes increasing the rate at which the unicast stream is transmitted.

5. The method of claim 1 comprising sending a message to the FCC server once the user interface device joins the multicast.

6. The method of claim 1, wherein the unicast stream is transmitted with an initial delay that is determined adaptively by the FCC server.

7. The method of claim 1, comprising further reducing the rate at which the unicast stream is transmitted to the user interface device at least a minimum join time interval after sending the multicast join request from the user interface device.

8. The method of claim 1 comprising sending a message from the user interface device to leave the multicast before restarting transmitting the unicast stream.

9. The method of claim 1, wherein restarting transmitting the unicast stream includes transmitting the unicast stream at a higher rate without backing off.

10. At a user interface device, a method of processing a fast channel change (FCC) transaction comprising the steps of:
    sending a FCC request to an FCC server in response to a channel change request;
    receiving a unicast stream from the FCC server;
    sending a multicast join request to join a multicast of the requested channel;
    determining a maximum multicast join time for ensuring a seamless handover to the multicast;
    sending a restart message to the FCC server if the maximum multicast join time elapses before the user interface device joins the multicast; and
    receiving a restarted unicast stream from the FCC server.

11. The method of claim 10, wherein the maximum multicast join time is determined as a function of a buffer level of the user interface device.

12. The method of claim 10, wherein the maximum multicast join time is determined repeatedly before the user interface device joins the multicast.

13. The method of claim 10 comprising sending a message to the FCC server once the user interface device joins the multicast.

14. A non-transitory, processor-readable storage medium comprising executable program code that when executed in the user interface device implements the method of claim 10.

15. The method of claim 10 comprising sending a message from the user interface device to leave the multicast before receiving the restarted unicast stream.

16. The method of claim 10, wherein the restarted unicast stream is transmitted from the FCC server at a higher rate without backing off.

17. At a fast channel change (FCC) server, a method of processing a FCC transaction comprising the steps of:
    receiving a FCC request sent in response to a channel change request at a user interface device;
    transmitting a unicast stream to the user interface device in response to the FCC request;
    reducing the rate at which the unicast stream is transmitted to the user interface device;
    signaling the user interface device to join a multicast of the requested channel;
    receiving a restart message from the user interface device if a maximum multicast join time for ensuring a seamless handover elapses before the user interface device joins the multicast; and
    restarting transmitting the unicast stream to the user interface device in response to the restart message.

18. The method of claim 17, wherein restarting transmitting the unicast stream includes increasing the rate at which the unicast stream is transmitted.

19. The method of claim 17 comprising receiving a message from the user interface device indicating that the user interface device has joined the multicast.

20. The method of claim 17, wherein the unicast stream is transmitted with an initial delay that is determined adaptively by the FCC server.

21. The method of claim 17, comprising further reducing the rate at which the unicast stream is transmitted to the user interface device at least a minimum join time interval after the multicast join request is sent from the user interface device.

22. A non-transitory, processor-readable storage medium comprising executable program code that when executed in the FCC server implements the method of claim 17.

23. The method of claim 17, wherein the FCC server restarts transmitting the unicast stream after the user interface device sends a message to leave the multicast.

24. The method of claim 17, wherein restarting transmitting the unicast stream includes transmitting the unicast stream at a higher rate without backing off.

* * * * *